Figure 1:
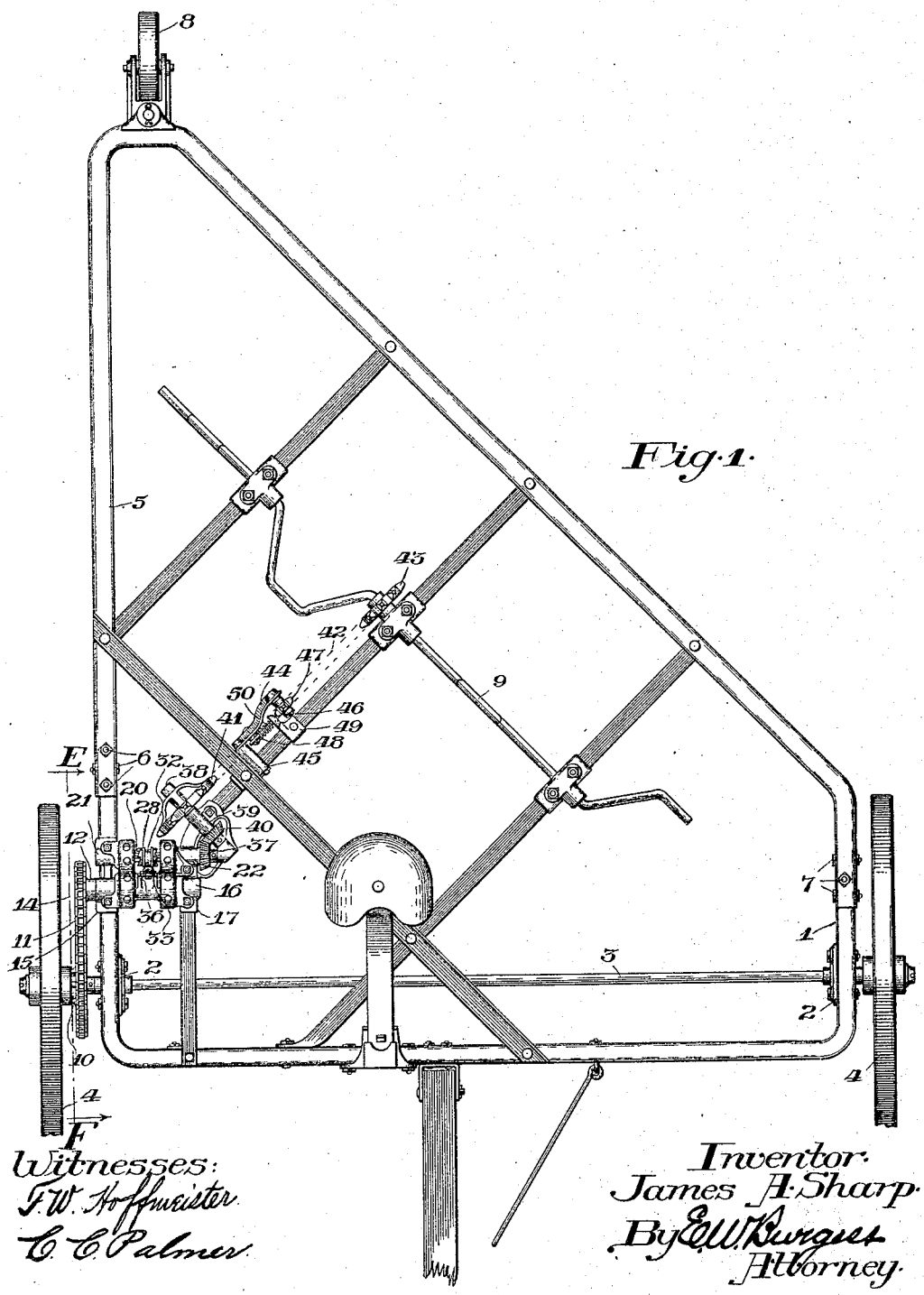

J. A. SHARP.
COMBINED SIDE DELIVERY HAY RAKE AND TEDDER.
APPLICATION FILED DEC. 13, 1911.
1,185,844.
Patented June 6, 1916.
2 SHEETS—SHEET 2.
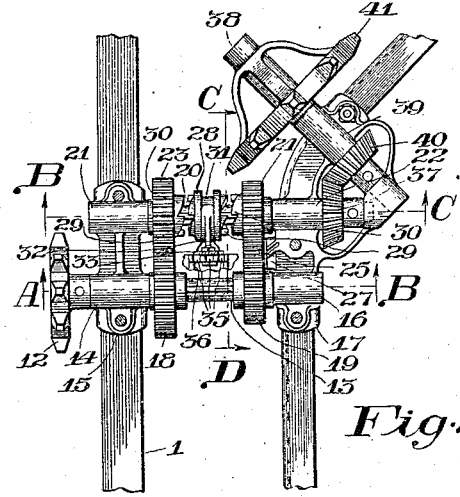
Fig. 2.
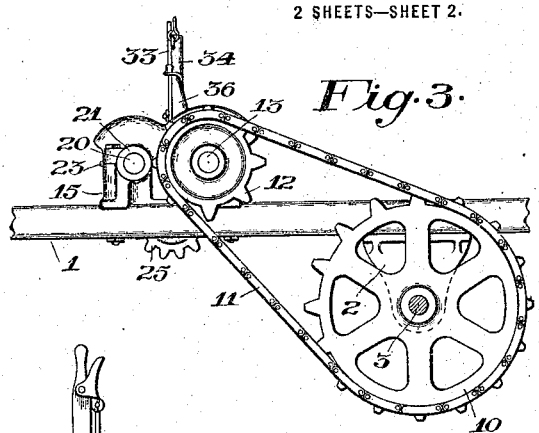
Fig. 3.
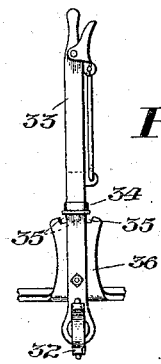
Fig. 4.
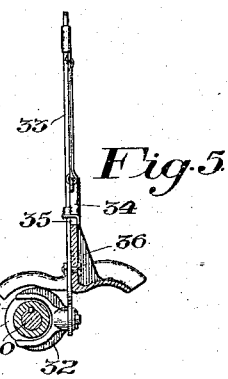
Fig. 5.
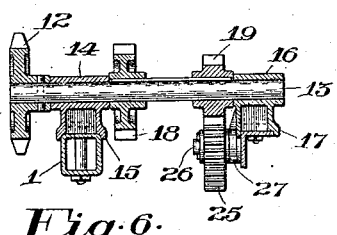
Fig. 6.
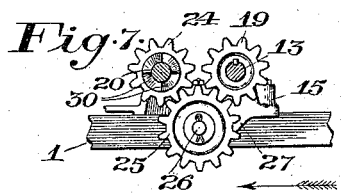
Fig. 7.
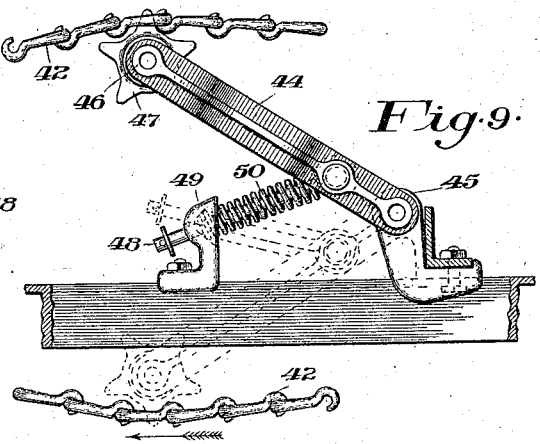
Fig. 8.
Fig. 9.
Witnesses:
F. W. Hoffmister
C. C. Palmer
Inventor:
James A Sharp
By E. W. Burgess
Attorney.

UNITED STATES PATENT OFFICE.

JAMES A. SHARP, OF SPRINGFIELD, OHIO, ASSIGNOR TO INTERNATIONAL HARVESTER COMPANY OF NEW JERSEY, A CORPORATION OF NEW JERSEY.

COMBINED SIDE-DELIVERY HAY RAKE AND TEDDER.

1,185,844. Specification of Letters Patent. Patented June 6, 1916.

Application filed December 13, 1911. Serial No. 665,421.

*To all whom it may concern:*

Be it known that I, JAMES A. SHARP, a citizen of the United States, residing at Springfield, in the county of Clark and State of Ohio, have invented certain new and useful Improvements in Combined Side-Delivery Hay Rakes and Tedders, of which the following is a specification.

My invention relates to combined hay rakes and tedders, and has for its object to improve and simplify the construction and operation of such machines. In carrying out this object I employ raking mechanism rotated at a given speed in one direction for raking, and in a reverse direction at a higher speed for tedding, means whereby the direction of movement of the raking mechanism may be readily and quickly reversed, and an improved chain tightener in connection with the reversible variable speed power transmitting means.

One form which my invention may assume is exemplified in the following description and illustrated in the accompanying drawings, in which—

Figure 1 represents a top plan view of the wheeled frame of a side delivery hay rake having my improved gear mechanism mounted thereon; Fig. 2 represents a top plan view of part of the gear mechanism and wheeled frame structure on an enlarged scale; Fig. 3 is a side elevation of Fig. 1 along line E—F; Fig. 4 is a side elevation of the gear shipping lever; Fig. 5 is a side elevation of Fig. 4; Fig. 6 is a sectional part of Fig. 2 along line A—B; Fig. 7 is a sectional end elevation of part of Fig. 2 along line C—D; Fig. 8 is a sectional detail of part of Fig. 2 along line B—C; and Fig. 9 is a detached detail of the power transmitting mechanism connecting the rake shaft with the axle of the machine and designed to illustrate the operation of the reversible chain tightener.

The same reference characters designate like parts throughout the several views.

The wheeled frame of the machine is substantially triangular in form, including, preferably, a front U-shaped member 1, having its head portion arranged transversely of the machine, and to the rearwardly disposed legs thereof are secured bearing boxes 2, having opposite ends of an axle member 3 journaled therein, and 4 represents carrying and traction wheels mounted upon said axle.

5 represents an extension of one of the legs of the U-shaped frame member, extending rearward therefrom at right angles with the axle upon the right-hand side of the machine, having its front end connected with the rear end of the leg portion by means of bolts 6, and its rear end turned laterally and then diagonally forward and having a portion thereof turned at right angles with the axle and connected with the opposite leg of the U-shaped member by means of bolts 7, and 8 represents a caster wheel mechanism adapted to support the rear right-hand corner of the triangular wheeled frame.

9 represents a rake shaft mounted in bearings carried by the wheeled frame, the shaft being preferably multiple cranked for the purpose of receiving a series of common form of raking and tedding forks that are driven in an orbital path, the rakes not being illustrated, and any common form of cylindrical raking mechanism may be used, my invention being confined to the means for transmitting motion from the axle to the raking and tedding mechanism.

10 represents a main driving sprocket secured to the axle at the right-hand side of the machine between the carrying wheel and the rearwardly extending member of the wheeled frame, and having a sprocket chain 11 connecting it with a sprocket wheel 12 secured to the outside end of a transversely arranged countershaft 13 journaled in a bearing 14 forming part of the bearing box 15 secured to the wheeled frame of the machine and having the opposite end thereof journaled in a bearing 16 forming part of a gear frame 17 secured to the wheeled frame.

18 represents a pinion keyed to shaft 13 adjacent the inner end of the bearing 14 therein, and 19 represents a pinion having a relatively smaller diameter and which is also keyed to shaft 13 adjacent the bearing 16.

20 represents a countershaft arranged parallel with shaft 13, having its outside end journaled in a bearing 21 integral with the rear end of the box 15, and the inner end thereof journaled in a bearing 22 forming part of the gear frame 17.

23 represents a pinion loosely mounted upon said shaft adjacent the inside end of bearing 21 and meshing with pinion 18, and 24 represents a pinion loosely mounted upon said shaft adjacent the end of bearing 22 and meshing with an intermediate pinion 25 that is journaled upon a stud 26 projecting laterally from a depending web portion 27 integral with the gear frame 17 and meshing with pinion 19.

28 represents a clutch sleeve splined to the shaft 20 intermediate the pinions 23 and 24 and having a sliding movement thereon. The sleeve is provided with clutch members 29 at opposite ends thereof that are adapted to engage with complemental clutch members 30 upon the inner ends of the oppositely disposed adjacent pinions 23 and 24, and a central circumferential groove 31 that receives a clutch shipping fork 32 that is secured to the lower end of a hand lever 33 pivotally mounted upon a fixed part of the frame structure and having a sliding detent 34 mounted thereon that is adapted to selectively engage with a series of three notches 35 formed in a concentrically arranged bracket member 36 integral with the gear frame 17, the operation of the hand lever being such that when it is swung toward the right-hand side of the machine to the limit of its movement in that direction, the clutch sleeve 28 will be caused to engage with the pinion 24, and when said lever is swung to the limit of its movement in an opposite direction, said clutch sleeve will be caused to engage with pinion 23, and when the lever is at the middle of its throw the sleeve is retained in a neutral position.

37 represents a bevel pinion that is secured to the inside end of shaft 20 adjacent the opposite end of the bearing box 22 from that with which pinion 24 bears against.

38 represents a countershaft arranged parallel with the axis of the rake shaft 9 and journaled in a bearing 39 forming part of the gear frame 17.

40 represents a bevel pinion secured to the front end of shaft 38 and meshing with pinion 37, and 41 a sprocket wheel secured to the opposite end of said shaft and connected, by means of a power transmitting chain 42, with a sprocket wheel 43 secured to the rake shaft 9.

The chain tightener mechanism is operatively connected with chain 42, and includes a swinging arm 44, having its front end pivotally connected with a bracket member 45 secured to a fixed part of the wheeled frame, and provided at its upper end with a laterally projecting stud 46, upon which is journaled an idler sprocket wheel 47 that engages with chain 42.

48 represents a link having one end pivotally connected with the arm 44 intermediate its ends, the opposite end of the link being slidably received by an opening in a bracket 49 secured to a fixed part of the wheeled frame structure.

50 represents a compression spring encircling the link and operative between the bracket member 49 and the opposite end of the link in a manner to yieldingly swing the arm 44 in a direction to cause the idler sprocket wheel 47 to engage with the chain.

In the operation of machines of the class indicated it is required that the raking mechanism, when being operated as a tedder, shall move in a reverse direction; that is, with a movement over the ground in a direction opposite or at an angle inclined rearward from that of the line of advance of the machine, while in raking the movement is in the same direction, or at an angle inclined toward the line of draft; therefore, if a reverse movement be given to the power transmitting chain, it is desirable that the chain tightener idler be kept in engagement with the slack lead of the chain in either direction of movement thereof, and the mechanism devised for the purpose of attaining that result is one of the features of my invention. Referring to Fig. 9 of the drawings, when the mechanism is adjusted in a manner whereby the raking mechanism is moved in a direction for raking, the upper lead of the chain 42 is the slack one, and consequently the idler sprocket should engage therewith, as shown by full lines, and the spring 50, operative along a line above the axis of the arm, will yieldingly press the latter in the direction required, and when the lower lead becomes the slack portion, the arm may be swung downward until the operative line of the spring passes below the axis of the arm and the latter is pressed in an opposite direction about its axis with the idler mounted thereon engaging with the opposite lead of the chain.

The countershaft 13 derives motion from the axle, and it in turn transmits motion to the two pinions 23 and 24 running loosely upon the shaft 20, to the pinion 24, by means of the intermediate pinion 25 and pinion 19, to pinion 23 directly from pinion 18. Pinion 19 is equal in its diameter to that of pinion 24, therefore the latter will rotate with the same speed as the shaft 13, and when engaged with the clutch sleeve 28 will cause shaft 20 to rotate with the same speed and in the same direction. Pinion 18 has a greater diameter than pinion 23, therefore shaft 20 will rotate at a higher rate of speed than shaft 13 when the clutch sleeve is caused to engage with pinion 23, and pinions 18 and 23 being directly engaged, the latter will rotate in an opposite direction. The direction of rotation of the rake shaft is therefore determined by the position of adjustment of the hand lever 33.

While I have shown and described but one form herein, it is to be understood, nevertheless, that my invention is capable of other modifications, and therefore many changes may be made in the construction and arrangement of the several parts without departing from the spirit of my invention as disclosed in the appended claims.

What I claim as my invention, and desire to secure by Letters Patent, is:

1. In a combined rake and tedder, raking mechanism, reversible driving mechanism therefor including a chain, and reversible tensioning means to engage with different leads of said chain according to the direction of movement of the driving mechanism.

2. In a combined rake and tedder, raking mechanism, driving mechanism to actuate said raking mechanism in different directions at different speeds, an endless flexible connecting element between said reversible driving mechanism and raking mechanism, and tensioning means engageable with the different leads of said flexible connecting element.

3. In a combined rake and tedder, raking mechanism, reversible driving mechanism therefor including an endless flexible transmission element, and reversible tensioning means to engage with the different leads of said connecting element according to the direction of movement of the driving mechanism.

4. In a combined rake and tedder, a frame, rotatable raking mechanism thereon, reversible driving means therefor including a transmission chain, a reversible chain tightener lever comprising a member pivoted to said frame and engageable with either lead of the chain, and resilient means pivotally connected between said frame and a point intermediate the engaging member for holding the latter yieldingly in either position of adjustment.

JAMES A. SHARP.

Witnesses:
G. W. RUSSELL,
CHAS. L. NISSLEY.

Copies of this patent may be obtained for five cents each, by addressing the "Commissioner of Patents. Washington, D. C."